United States Patent
Todt (10) Patent No.: US 6,875,712 B2
(45) Date of Patent: Apr. 5, 2005

(54) MATERIAL FOR PROTECTING ARTICLES HAVING A NONWOVEN FABRIC BONDED TO A SHRINK FILM BY AN ADHESIVE APPLIED IN A PRE-DETERMINED PATTERN

(75) Inventor: Gregory L. Todt, Union, MI (US)

(73) Assignee: Transhield Technology AS, Oslo (NO)

( * ) Notice: Subject to any disclaimer, the term of this patent is extended or adjusted under 35 U.S.C. 154(b) by 0 days.

(21) Appl. No.: 10/079,642

(22) Filed: Feb. 20, 2002

(65) Prior Publication Data

US 2002/0077015 A1 Jun. 20, 2002

Related U.S. Application Data

(63) Continuation-in-part of application No. 09/664,896, filed on Sep. 19, 2000, now Pat. No. 6,562,740.

(51) Int. Cl.[7] .......................... B32B 27/04; B32B 27/12; B32B 5/02
(52) U.S. Cl. ....................... 442/149; 442/394; 442/408; 428/34.9; 428/198; 428/311.1
(58) Field of Search ................................ 442/149, 394, 442/408; 428/34.9, 198, 311.1

(56) References Cited

U.S. PATENT DOCUMENTS

| | | |
|---|---|---|
| 3,017,729 A | 1/1962 | Cheeley |
| 3,653,497 A | 4/1972 | Hornstein |
| 3,694,995 A | 10/1972 | McKinney |
| 3,809,223 A | 5/1974 | Kendall |
| 4,247,509 A | 1/1981 | Talbot |
| 4,725,473 A | 2/1988 | Van Gompel |
| 4,748,070 A | 5/1988 | Beehler |
| 4,763,783 A | 8/1988 | Talbot |
| 4,821,785 A | 4/1989 | Rolan |
| 4,891,249 A | 1/1990 | McIntyre |
| 4,938,522 A | 7/1990 | Herron et al. |
| 5,029,933 A | 7/1991 | Gillem |
| 5,149,578 A | 9/1992 | Wheatley et al. |
| 5,342,469 A | 8/1994 | Bodford |
| 5,491,017 A | 2/1996 | Todt |
| 5,536,555 A | 7/1996 | Zelazoski et al. |
| 6,562,740 B1 * | 5/2003 | Todt ........................... 442/149 |

FOREIGN PATENT DOCUMENTS

| | | |
|---|---|---|
| GB | 1194706 | 6/1970 |
| JP | 52-27595 | 7/1977 |
| JP | 56-84778 | 7/1981 |
| JP | 60-198239 | 10/1985 |
| JP | 62-85940 | 4/1987 |
| JP | 2-192941 | 7/1990 |
| JP | 4-215924 | 8/1992 |

* cited by examiner

Primary Examiner—Elizabeth M. Cole
Assistant Examiner—Norca L. Torres
(74) Attorney, Agent, or Firm—Harness, Dickey & Pierce, P.L.C.

(57) ABSTRACT

A shrinkable protective material includes a nonwoven fabric bonded to a shrinkable film by an adhesive that is applied to either the nonwoven fabric or the shrinkable film in a pre-determined pattern. Upon shrinking, the nonwoven fabric separates or releases from the film and forms cushions or pillows holding the film off of the surface being protected. The edge portions of the cushions or pillows act as shock absorbers and deflect over the bonds, thus protecting the surface against the abrasive adhesively bonded portions.

23 Claims, 7 Drawing Sheets

MATERIAL FOR PROTECTING ARTICLES HAVING A NONWOVEN FABRIC BONDED TO A SHRINK FILM BY AN ADHESIVE APPLIED IN A PRE-DETERMINED PATTERN

CROSS-REFERENCE TO RELATED APPLICATIONS

This application is a continuation-in-part of U.S. patent application Ser. No. 09/664,896 filed on Sep. 19, 2000 now U.S. Pat. No. 6,562,740. The disclosure of the above application is incorporated herein by reference.

TECHNICAL FIELD

This invention relates to a material for protecting articles during transport and storage, a method of manufacturing the material, and a method of using the material to protect articles.

BACKGROUND OF THE INVENTION

Large articles, such as automobiles, machinery and boats must often be transported from the factory to the ultimate consumer on open trucks where they are exposed to the environment. Consumers expect that new automobiles, boats and machinery to be in pristine condition, and will not tolerate defects. As discussed in prior U.S. Pat. No. 5,491,017, damage may be caused by a number of factors, including acid rain and hurled objects, such a small rocks and stones. The wrap material disclosed in U.S. Pat. No. 5,491,017 includes a nonwoven fabric intermittently bonded to a shrinkable and stretchable film that has a predetermined shrink response as heat is applied thereto. The material is formed into a bag which is placed over the object be protected. The bag is then shrunk around the object with the nonwoven fabric engaging the surface of the object and supporting the film off of the surface of the object.

SUMMARY OF THE INVENTION

The present invention relates to an improved material and methods for its manufacture. An adhesive is applied to a contoured gravure roll whereby when rotated across a first material of nonwoven fabric or thermoplastic film, an adhesive is applied in a pre-determined pattern. The adhesive generally covers from about 4.0 to about 33.0% of the nonwoven fabric or thermoplastic film to which it is applied. The other of the nonwoven fabric or thermoplastic film is then adhered to the material bearing the adhesive by bringing the non-adhesive bearing material into contact with the adhesive bearing material with a limited amount of pressure. When the film is shrunk, the nonwoven fabric separates from the film in the areas between the bonds to provide raised portions, thereby protecting the surface of the article from contact with the bonded portion of the nonwoven fabric.

Often, it is desirable to prevent contact between the bonded portions of the nonwoven fabric and the surface because the cured adhesive occurring along the bonded portion of the fabric is abrasive, as is the film, and any contact by either the film or the adhesive with the surface can cause damage. By protecting the surface of the object from the adhesive bonds, damage caused by rubbing of the bonded portion of the nonwoven fabric across the surface being protected, which occurs for example during handling of the object during transport storage, is prevented. The repeating nature of the pattern of adhesive also facilitates manufacture and strengthens and adds tear resistance to the material.

BRIEF DESCRIPTION OF THE DRAWINGS

These and other advantages of the present invention will become apparent from the following description, with reference to the accompanying drawings, in which.

DETAILED DESCRIPTION OF THE PREFERRED EMBODIMENTS

Referring now to the figures, a shrinkable, protective material made according to the present invention is generally indicated by the numeral 10. Protective material 10 includes a layer 12 of a shrinkable film and a layer 14 of a nonwoven fabric, preferably a hydro-entangled nonwoven fabric. By the phrase "shrinkable, stretchable film", it is meant that the thermoplastic film retains a predetermined level of post shrink elasticity and a relatively low post shrink modulus after heating. These so called shrinkable, stretchable films are available from Wright Plastics Corporation, Prattville, Ala. and sold as film TS-5 or a film sold as film C-40 by Crayex Corporation, Piqua, Ohio. The nonwoven fabric can be made out of fibers such as polyester, nylon 6,6, or a combination of wood pulp and staple polyester fibers. A commercially available hydro-entangled nonwoven fabric useful in accordance with the teachings of the present invention is Sontara, available from DuPont, Inc.

Figures 3, 4:
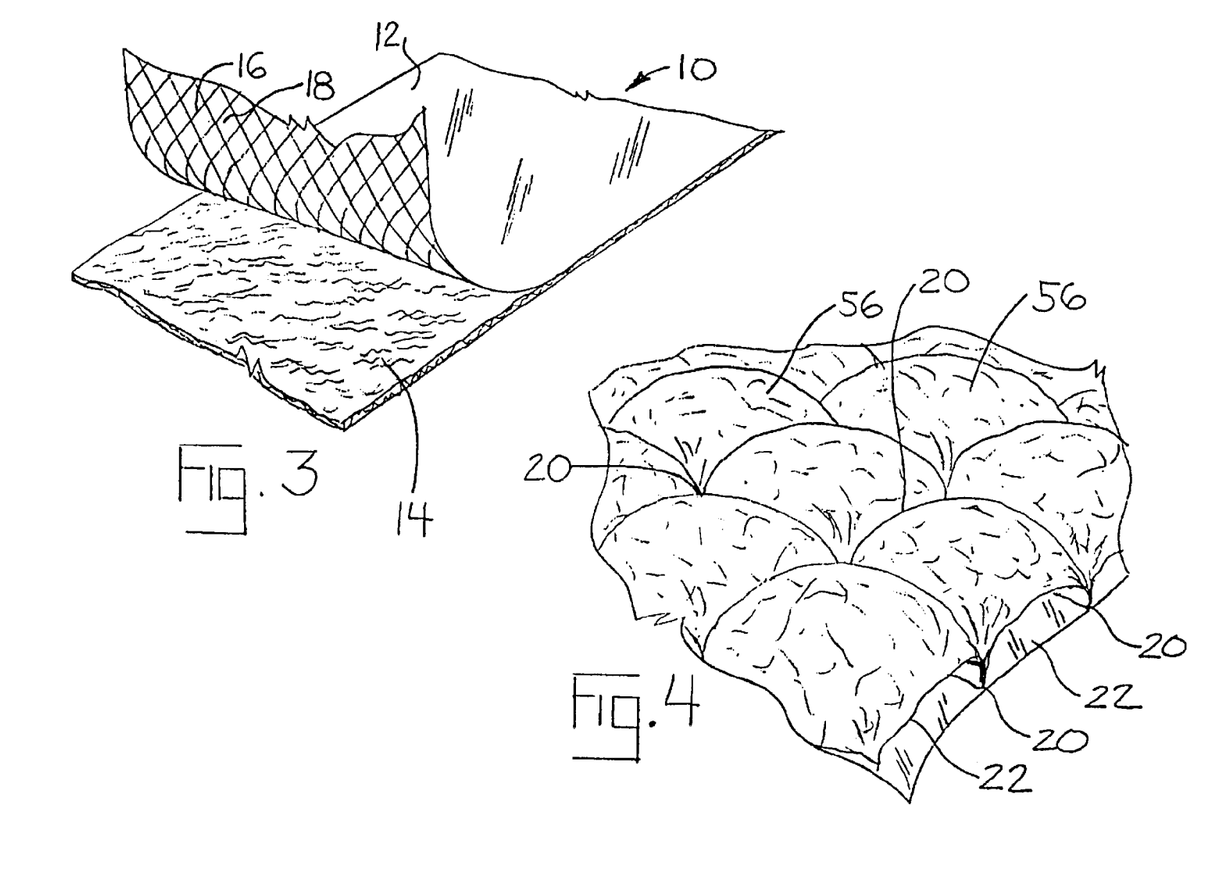
FIG. 3 is a fragmentary view in perspective of the material made using the gravure roll illustrated in FIG. 2 with the film layer peeled away from the nonwoven fabric.
FIG. 4 is a fragmentary view in perspective of the material illustrated in FIG. 3 after the material has been shrunk.

The film and nonwoven fabric are secured to one another by an adhesive which is placed on the film according to the method depicted in FIG. 1 or the nonwoven according to the method depicted in FIG. 10 as will hereinafter be described in a predetermined pattern generally indicated by the numeral 16 (FIG. 3). Accordingly, areas 18 are defined on the film or the nonwoven that are free of the adhesive between the areas covered by the adhesive pattern 14. The adhesive may be any on of a number of commonly available hot melt adhesives such as an S-I-S (styrene-isoprene-styrene), S-E-S (styrene-ethylene-styrene) type adhesive which are available from ATO Corp. of Findley, Ohio and H .B. Fuller Corp. of Minneapolis, Minn. Yet another useful adhesive is #9016 LDPE available from the Bostik Corp. of Middleton, Me. While the above described hot melt adhesives are commonly known as a "pressure sensitive" hot melt adhesives, non-pressure sensitive hot melt adhesives are also useful. For example and without limitation, polypropylene based hot melt adhesives such as #9058-35 and #9058-70 available from Tivoli of Hamburg, Germany and #4315 LLDPE, available from Bostik Corp. are examples of useful non-pressure sensitive hot melt adhesives. During manufacture, the nonwoven fabric and film are lightly pressed against one another to cause the adhesive to bond the film and nonwoven fabric together. As a result of the patterning of the adhesive, the adhesive generally need only cover between about 4.0 to about 33.0% of the nonwoven fabric or film to which it is applied. Thus, no adhesive bonding occurs along at least about 67.0% of the interface between the nonwoven material and thermoplastic film.

Accordingly, the bonded areas 20 of the material are much smaller than the unbonded areas 22.

Figure 1:
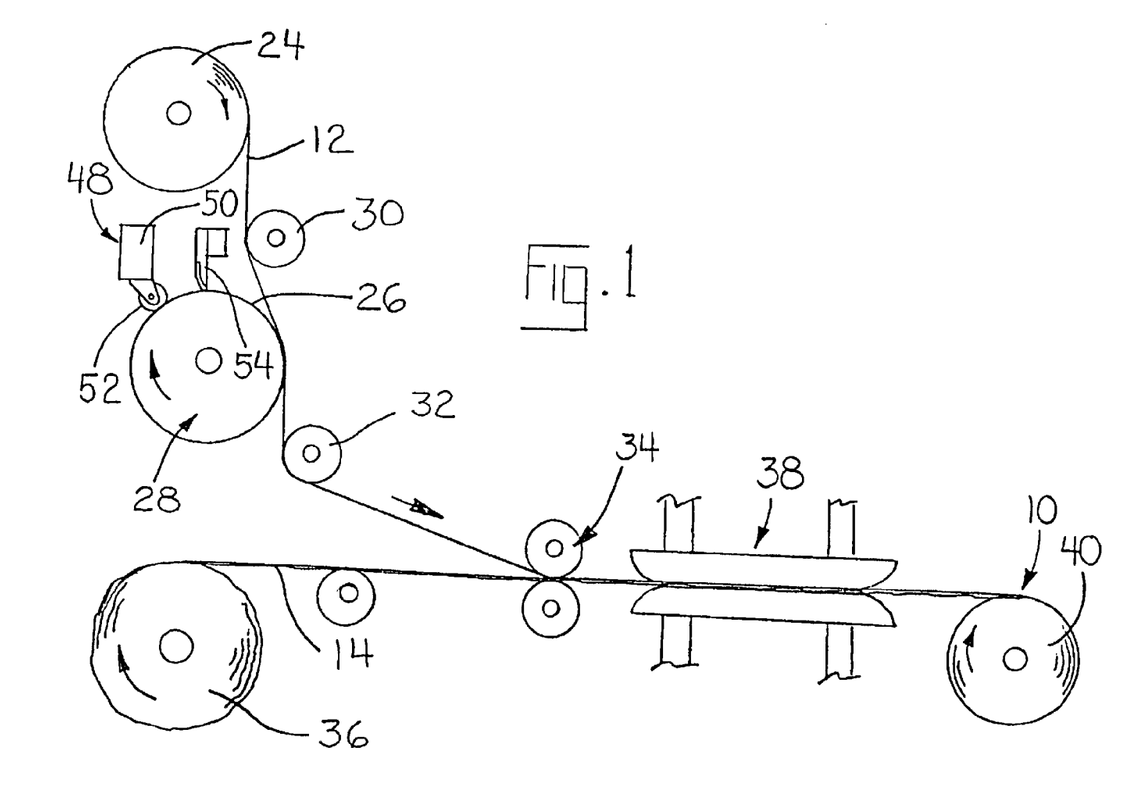
FIG. 1 is a schematic illustration of a first method of manufacturing the material of the present invention.

Referring specifically now to FIG. 1, a first method of manufacturing the material 10 will now be described. A roll 24 of the film 12 is provided, and the film 12 is fed off of the roll 24 and is carried into engagement with the outer circumferential surface 26 of a rotating contoured gravure roll generally indicated by the numeral 28. The gravure roll 28 is available from Karl Wenk GmbH, Lorrach Brombach, Germany. The film is held against the outer surface 26 of the gravure roll 28 by idler rollers 30,32. As will be described hereinafter, the gravure roll applies adhesive to the film in the predetermined pattern 16. The film 12, with the adhesive applied thereto, is then fed through a set of rollers 34, through which the nonwoven fabric 14 is also fed after being pulled from a roll 36 so that the film 12 and nonwoven fabric 14 are brought into substantially parallel alignment with one another. The film and nonwoven are then carried through a conventional bonding station 38. The bonding station 38 is adjusted to provide light pressure to the film 12 and nonwoven fabric 14 to cause the film and nonwoven fabric to be bonded only in those areas in which adhesive has been applied to the film. The material 10 is wound on a take up roll 40. The bonding station 38 and the supports for the various rolls of material are a part of a conventional laminating machine available from Cavitec AG, Munchwilen, Switzerland.

Figures 2, 5, 6, 7:
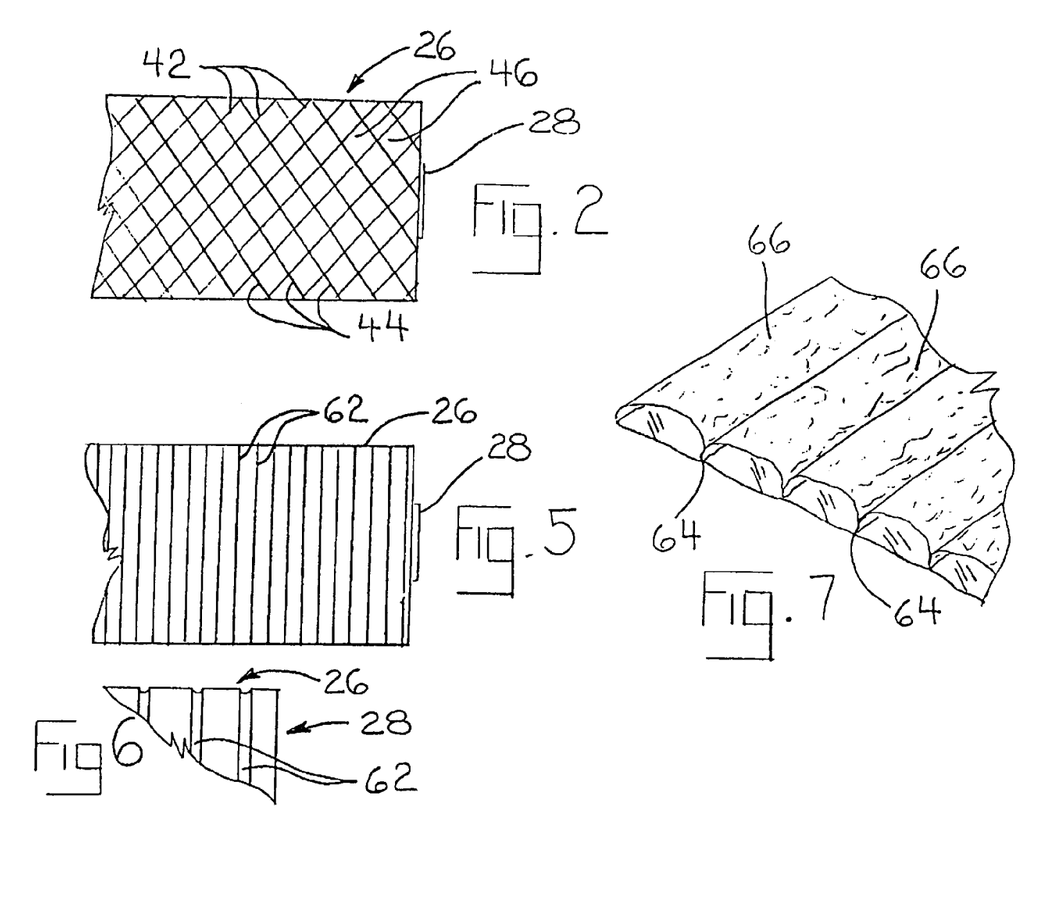
FIG. 2 is a plan view of the gravure roll used to apply the adhesive to the film in the manufacture of the material according to the present invention.
FIG. 5 is a view similar to FIG. 2, but illustrating another embodiment of the gravure roll used to apply adhesive to the film.
FIG. 6 is an enlarged view of the circumscribed portion of FIG. 5.
FIG. 7 is a view similar to FIG. 4, but illustrating the material made using the gravure roll illustrated in FIG. 5.

According to a first embodiment, the outer circumferential surface 26 of the gravure roll 28 is provided with a first set of substantially parallel grooves 42 and a second set of substantially parallel grooves 44 which extend obliquely, i.e., perpendicularly with respect to the first set of grooves to define diamond-shaped areas 46 on the surface 26. The grooves 42,44 define lower portions of the surface 26 and the areas 46 define the outer circumferential surface 26. The adhesive is maintained in molten form in a conventional adhesive dispenser generally indicated at 48.

Dispenser 48 includes a receptacle 50 in which the adhesive is maintained in the molten state and a roller 52 that extends parallel to the outer circumferential surface 26 and applies adhesive from the receptacle 50 on the entire surface 26, including both the grooves 42,44 and the areas 46. The adhesive is sufficiently liquid that it readily fills the grooves 42,44. The roll 26, after the adhesive is applied to the outer circumferential surface 28, is rotated past a conventional doctor blade 54 that scrapes the adhesive off of the areas 46, thereby leaving adhesive only in the grooves 42, 44, so that adhesive is deposited on the film 12 in a substantially diamond shaped pattern 16. Other linear and non-linear, generally parallel adhesive patterns such as a hexagonal pattern, while not specifically illustrated, are contemplated and should theoretically give rise to the so-called pillows described in greater detail below.

Figure 8:
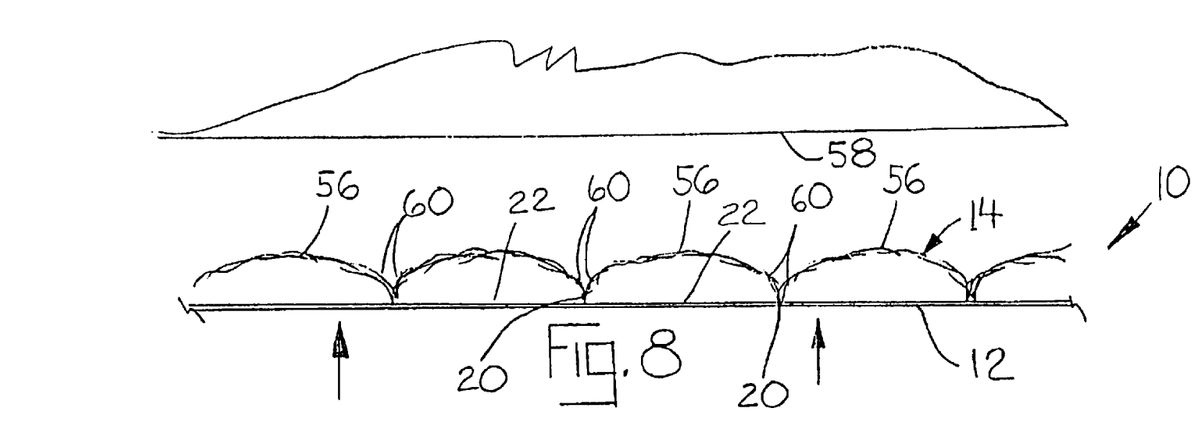
FIG. 8 is an enlarged cross-sectional view of the material illustrated in FIG. 4, but with the material displaced from the surface protected by the material.
Figure 9:
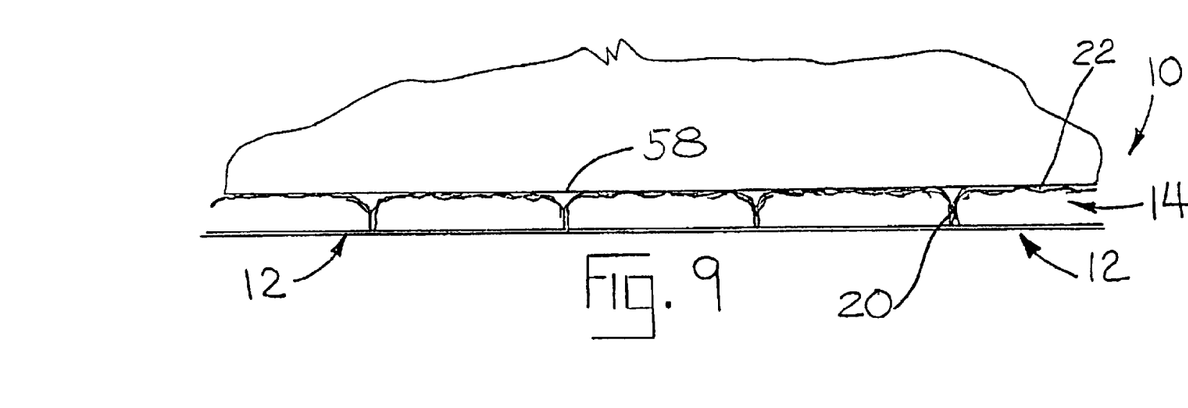
FIG. 9 is a view similar to FIG. 8, but with the nonwoven fabric of the present material engaged with the surface being protected.

As illustrated in FIG. 3, before the material 10 is shrunk by applying heat thereto in a manner well known to those skilled in the art, the nonwoven fabric 14 is bonded to the film 12 in the areas where adhesive has been applied to the film as defined by the pattern 16. The portions of the nonwoven fabric 14 which are not bonded to the film 12 overlay and engage the areas 18 of the film which are free of adhesive. However, after the material 10 is shrunk, as indicated in FIG. 4, since the film 12 shrinks and the nonwoven fabric 14 does not shrink in any appreciable amount, the portions of the nonwoven fabric 14 overlying the areas 18 which are unbonded gathers up to form soft, curved raised portions or pillows 56, which act as shock absorbers and have no square corners that might cut or abrade. These pillows 56 engage the surface of the article being protected (not shown in FIG. 4), thus forming a cushion supporting the film off of the surface of the article being protected. This is more clearly illustrated in FIGS. 8 and 9, in which the surface of the article being protected is indicated by the numeral 58. In FIG. 8, in which the material 10 is illustrated as being displaced from the surface 58, even though the material 10 has been shrunk, the pillows 56 define edge portions 60 which face one another and define the portions of the nonwoven fabric that are secured to the film 12 via the bonds 20. However, when the material 10 is used to protect the surface 58, the nonwoven fabric engages the surface and the edge portions 60 of the film are deflected by contact of the pillows 56 with the surface 58 such that the portions 60 cover the bonds 20, thus preventing contact between the bonds 20 and the surface 58. The bonds 20 tend to be more abrasive than the film itself and as such, it is important that the bonds 20 are precluded from coming into contact with the surface 58. Accordingly, the deflectable edge portions 60 prevent such contact, assuring that the surface 58 will be protected from the abrasive bonds 20. The cushioning effect of the nonwoven fabric also protects the surface 58 against damage by small hurled objects, such as stones, that may occur during transport. Because the nonwoven fabric and film are secured to each other at regular intervals, the material is essentially not capable of being stretched around curves or corners of the object 58 in such a manner that the nonwoven will be drawn down to the extent that the film comes in direct contact with the object 58.

The pillows 56 generally have an increasing average height dimension (from base to pinnacle prior to being applied over a surface) as the shrink rate of the film in both the machine and cross-machine directions increase. For example and without limitation, for a material having a shrink stretch film with an average thickness of about 5 mils and a nonwoven fabric layer having an average thickness of about 14 mils, the average pillow height will increase to approximately 140 mils at a 10% shrink rate. At a 20% shrink rate, the average pillow height is approximately 210 mils and at a 35% shrink rate, the average pillow height is approximately 380 mils. Thus, for each 10% increase in the shrink rate, the pillow height increases at least about two times (2×) prior to application over a surface. By the phrase "shrink rate", it is meant the amount of shrinkage occurring, not the speed at which shrinkage occurs.

While a substantially diamond shaped pattern has been discussed above as a preferred pattern, it should be understood that the invention is not limited to any particular pattern 16 of applying adhesive to the film 12. For example, and referring to the alternate embodiment of FIGS. 5–7, the outer circumferential surface 26 of the gravure roll may be provided with a single set of parallel grooves 62 that extend circumferentially around the roller 26. Accordingly a pattern of adhesive is deposited on the film 12 consisting of parallel lines. Referring to FIG. 7, the bonds 64 between the film 12 and nonwoven 14 are also elongated strips and the pillows 56 formed after shrinking extend the entire length of the material. As discussed above, one advantage of applying the adhesive in a distinct pattern is that the tear strength of the film is increased. Because the embodiment of FIGS. 5–7 does not have the crossing lines of adhesive as does the embodiment of FIGS. 2–4, the tear strength will be less, but less adhesive will also be used and because the nonwoven fabric is less restrained by the bonds, the nonwoven will more readily gather up and deflect.

Figure 10:
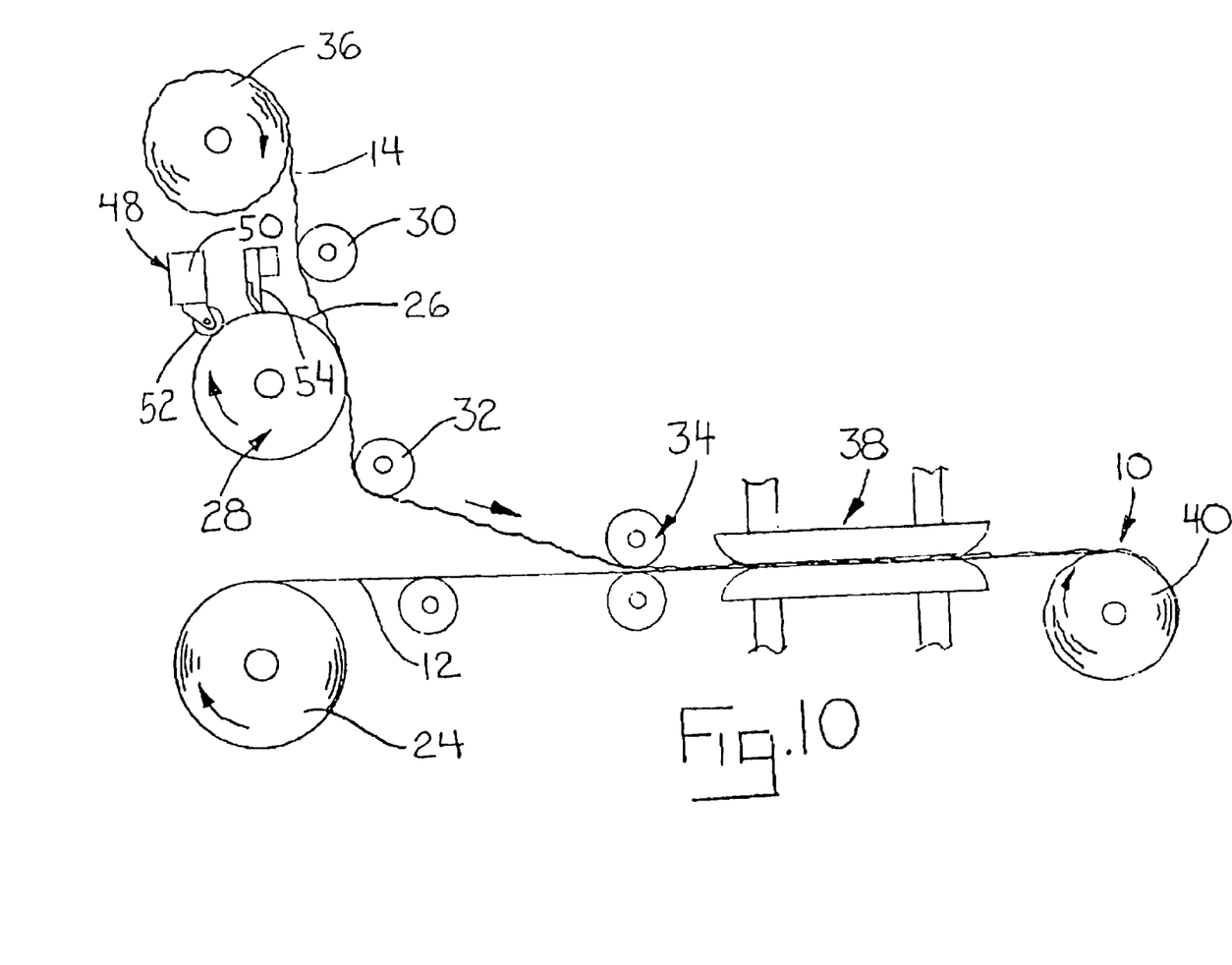
FIG. 10 is a schematic illustration of a second method of manufacturing the material of the present invention.

Referring now to FIG. 10, a second method of manufacturing the material 10 will now be described. A roll 36 of nonwoven fabric 14 is provided, and the nonwoven fabric is fed off of the roll 36 and is carried into relative proximity with the outer circumferential surface 26 of a rotating contoured gravure roll generally indicated by the numeral 28. The nonwoven fabric is held in relative proximity to the outer surface 26 of the gravure roll 28 by idler rollers 30, 32. As described above with regard to the method of FIG. 1, under the present method, the gravure roll applies adhesive to the nonwoven fabric in the pre-determined pattern 16. The nonwoven fabric 14, with the adhesive applied thereto, is then fed through a set of rollers 34, through which the shrinkable thermoplastic film 12 is also fed after being pulled from a roll 36 so that the film 12 and nonwoven fabric 14 are brought into substantially parallel alignment with one another. The film and nonwoven are then carried through a conventional bonding station 38. The bonding station 38 is adjusted to provide light pressure to the film 12 and nonwoven fabric 14 to cause the film and nonwoven fabric to be bonded only in those areas in which adhesive has been applied to the nonwoven fabric. The material 10 is wound on a take up roll 40. Thus, as should be understood by those skilled in the art, generally the same equipment can be used in the methods depicted in FIGS. 1 and 10, respectively. Certain key differences in carrying out the method depicted in FIG. 10 will now be described.

To ensure that adhesive remain essentially along the raised portions of the nonwoven material, the nonwoven material is held slightly away from the gravure roll 28 as the adhesive is being applied. By holding the nonwoven film away from the surface of the gravure roll by at least about $^{1}/_{1000}$ of an inch up to about $^{50}/_{1000}$ of an inch, the adhesive should be maintained along the raised portions of the nonwoven film as opposed to significantly entering the interstitial openings in the nonwoven fabric.

Likewise, to ensure that the thermoplastic film is adjoined to the nonwoven fabric with slight or limited pressure, the nip pressure is preferably maintained at a rate of between about 1.0 to about 9.0 lbs. of pressure per lineal inch (lb/pli) depending on the nonwoven fabric, thermoplastic film and adhesive employed as well as the rates at which the materials are fed through the manufacturing equipment. Nip pressures below about 1.0 lb/pli tend not to effectively join the materials and nip pressures above about 9.0 lb/pli cause the adhesive to be pressed into the interstitial openings of the nonwoven fabric which is undesirable. Thus, the nip pressure is set and constantly monitored to ensure that the adhesive remains along the raised portions of the nonwoven fabric to a very high degree.

Figures 11, 12:
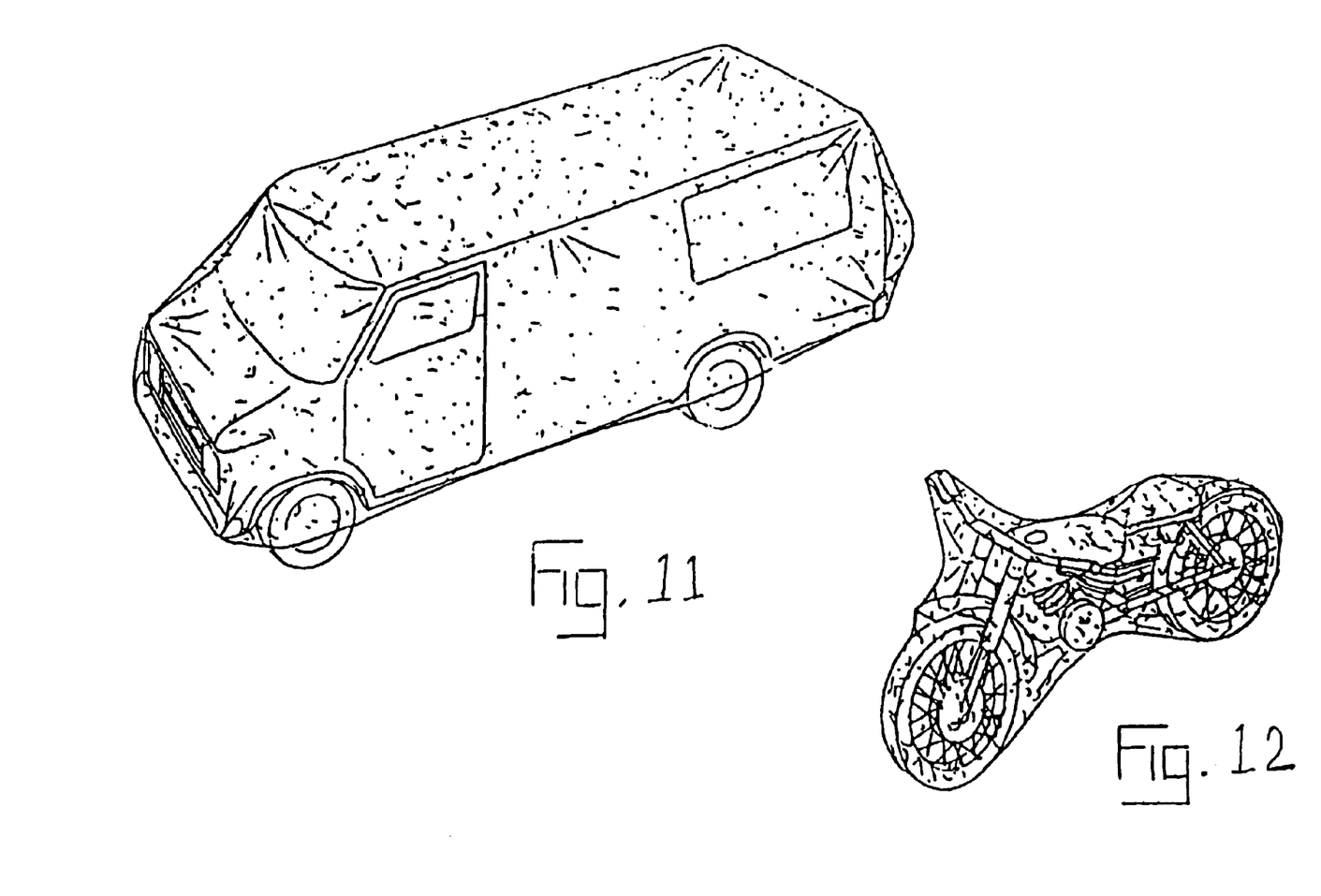
FIG. 11 is a perspective view of an automotive vehicle to be protected by the wrap material of the present invention.
FIG. 12 is a perspective view of a motorcycle to be protected by the wrap material of the present invention.
Figure 13:
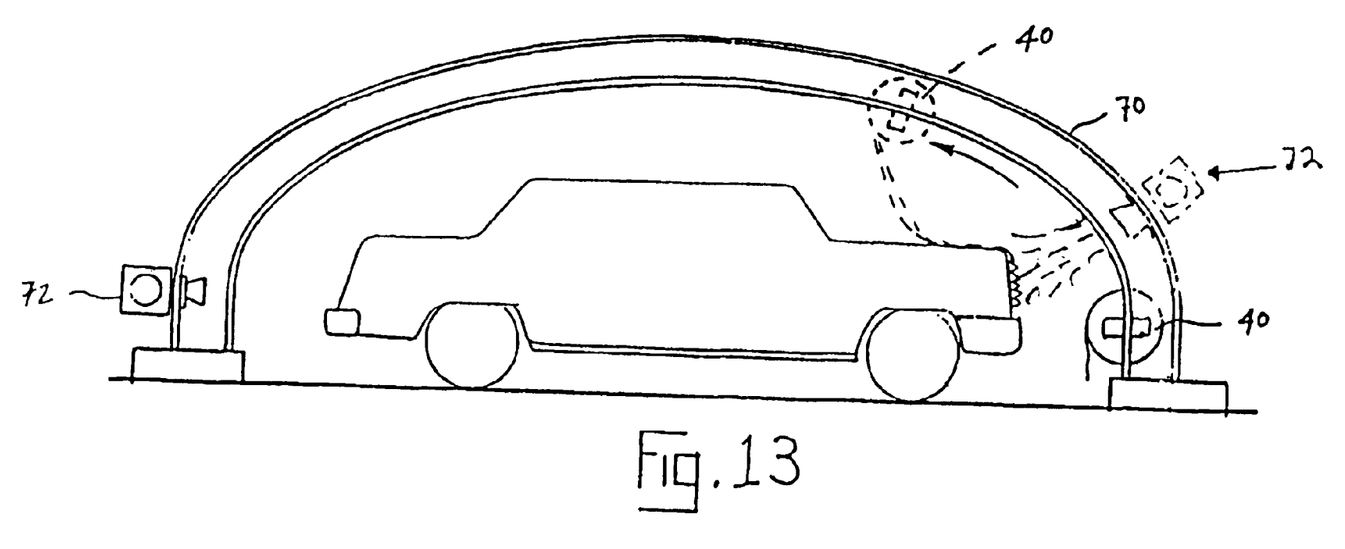
FIG. 13 is a schematic illustrating one manner of applying the material manufactured according to the processes illustrated in FIGS. 1 and 10 to an automotive vehicle.

As illustrated in FIGS. 11 and 12, the wrap material of the present invention is particularly useful in the transportation of articles of manufacture such as automobiles and motorcycles, by way of non-limiting example. To utilize the wrap material of the present invention, rolls 40 of the material are unwound as demonstrated in FIG. 13 and an appropriate amount is cut off. The edges of the material are then sealed to form a bag in which the nonwoven material is on the inside and the film is on the outside. Heat is then applied to the bag causing the film to shrink and the nonwoven material to form pillows or cushions as described in detail above. It should be noted that heat can be applied by any conventional means such as through the use of heat tunnels 70 including fixed or slidable heating elements 72 for high volume production or by the use of hand held blowers for manual applications.

While it will be apparent that the preferred embodiments of the invention disclosed are well calculated to fulfill the objects stated, it will be appreciated that the invention is susceptible to modification, variation and change without departing from the spirit thereof.

Further, most applications of the material will require that the layer 12 of a shrinkable, stretchable film beyond bonded to substantially the entire area of nonwoven fabric, it is fully contemplated area specific bonding embodiments are well within the scope of the present invention.

What is claimed is:

1. Shrink wrap material for protecting an object from surface damage comprising a nonwoven fabric layer for engaging said object when the material is applied to said object, a heat shrinkable thermoplastic film layer having a pre-determined shrink response when heat is applied thereto and an adhesive applied to said nonwoven fabric layer in a predetermined pattern defining first areas bearing said adhesive and second areas being void of said adhesive, said nonwoven layer being intermittently bonded to said film by said adhesive, whereby upon shrinking said film, said nonwoven fabric gathers up in the areas void of adhesive to form pillows that overlie the first areas of the film including adhesive, thus maintaining the bonded portions of the fabric and heat shrinkable film away from the object, thereby protecting said object from surface damage.

2. Shrink wrap material as claimed in claim 1, wherein said predetermined pattern defining said first area includes parallel lines.

3. Shrink wrap material as claimed in claim 1, wherein said predetermined pattern of adhesive defining said first areas include a first set of parallel lines and a second set of parallel lines crossing said first set of parallel lines.

4. Shrink wrap material as claimed in claim 3, wherein said patterned adhesive is substantially diamond shaped.

5. Shrink wrap material as claimed in claim 1, wherein said pillows have an increasing average height dimension from base to pinnacle prior to application over a surface as the shrink rate of said film increases.

6. Shrink wrap material as claimed in claim 5, wherein said average height dimension of said pillows increases by a factor of at least about two times for each 10% increase in the shrink rate of said film.

7. Shrink wrap material as claimed in claim 1, wherein said adhesive covers between about 4.0 to about 33.0% of said nonwoven fabric layer or shrinkable thermoplastic film to which it is applied.

8. Shrink wrap material as claimed in claim 7, wherein said adhesive is selected from the group consisting of pressure sensitive and non-pressure sensitive hot melt adhesives.

9. Shrink wrap material as claimed in claim 1, wherein said thermoplastic film is a shrinkable stretchable thermoplastic film.

10. Shrink wrap material as claimed in claim 1, wherein said nonwoven fabric is in the form of hydrogenated fibers.

11. Shrink wrap material for protecting an object from surface damage comprising: a heat shrinkable film outer layer having a pre-determined shrink response when heat is applied thereto, a nonwoven fabric inner layer for engaging said object when said material is shrunk around said object, and a patterned adhesive intermittently applied to said nonwoven layer and disposed between said film outer layer and said nonwoven fabric inner layer thereby coupling said film outer layer to said nonwoven fabric inner layer to form bonded areas and unbonded areas whereby, upon the application of heat to said material, the nonwoven fabric occurring along said unbonded areas gather up to overlie the adhesive occurring along said bonded areas thereby maintaining the bonded areas away from the object.

12. Shrink wrap material as claimed in claim 11, wherein said patterned adhesive includes substantially parallel lines.

13. Shrink wrap material as claimed in claim 11, wherein said patterned adhesive includes a first set of substantially parallel lines and a second set of lines substantially perpendicular to said first set of parallel lines.

14. Shrink wrap material as claimed in claim 13, wherein said patterned adhesive is substantially diamond shaped.

15. Shrink wrap material as claimed in claim 11, wherein said unbonded overlying portions of the nonwoven fabric include edge portions extending from the adhesive, said edge portions being deflected over said bonded areas.

16. Shrink wrap material as claimed in claim 15, wherein said unbonded areas of the nonwoven fabric separates from said film upon shrinking of the film.

17. Shrink wrap material as claimed in claim 11, wherein said unbonded areas of the nonwoven fabric include deflecting portions deflecting over the bonded areas of the nonwoven upon shrinking of the film to thereby protect the surface from abrasion by the bonded portions of the nonwoven.

18. Shrink wrap material as claimed in claim 11, wherein said unbonded overlying portions of nonwoven fabric include pillows having portions which extend over said bonded portions.

19. Shrink wrap material as claimed in claim 11, wherein said pillows have an increasing average height dimension from base to pinnacle prior to application over a surface as the shrink rate of said film increases.

20. Shrink wrap material as claimed in claim 19, wherein said average height dimension of said pillows increases by a factor of at least about two times for each 10% increase in the shrink rate of said film.

21. Shrink wrap material as claimed in claim 11, wherein said adhesive covers between 4.0 to about 33.0% of said film.

22. Shrink wrap material as claimed in claim 1, wherein said nonwoven fabric includes raised portions, whereby said adhesive is substantially applied only along the raised portions of said nonwoven.

23. Shrink wrap material as claimed in claim 12, wherein said nonwoven fabric includes raised portions, whereby said adhesive is substantially applied only along the raised portions of said nonwoven.

* * * * *